US010908279B2

(12) United States Patent
Scally et al.

(10) Patent No.: US 10,908,279 B2
(45) Date of Patent: Feb. 2, 2021

(54) ULTRASOUND/RADAR FOR EYE TRACKING

(71) Applicant: Facebook Technologies, LLC, Menlo Park, CA (US)

(72) Inventors: Brian Michael Scally, Seattle, WA (US); David R. Perek, Bellevue, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 47 days.

(21) Appl. No.: 15/456,376

(22) Filed: Mar. 10, 2017

(65) Prior Publication Data

US 2017/0261610 A1 Sep. 14, 2017

Related U.S. Application Data

(60) Provisional application No. 62/306,705, filed on Mar. 11, 2016.

(51) Int. Cl.
*G01S 15/42* (2006.01)
*G06F 3/01* (2006.01)
(Continued)

(52) U.S. Cl.
CPC ............ *G01S 15/42* (2013.01); *G01S 7/539* (2013.01); *G06F 3/013* (2013.01); *G02B 2027/0187* (2013.01); *H04N 13/383* (2018.05)

(58) Field of Classification Search
CPC .......... G01S 15/42; G01S 7/539; G01S 17/66; G06F 3/013; G06F 3/011–015;
(Continued)

(56) References Cited

U.S. PATENT DOCUMENTS 4,807,202 A * 2/1989 Cherri ................. G09B 9/05
367/129
5,777,892 A * 7/1998 Nabity .................... G01F 1/002
702/143

(Continued)

OTHER PUBLICATIONS

Dr. Schwiegerling, Eye Axis, Journal of Refractive Surgery, 2013, vol. 29, No. 8, 515-516.*

(Continued)

*Primary Examiner* — Patrick N Edouard
*Assistant Examiner* — Douglas M Wilson
(74) *Attorney, Agent, or Firm* — Fenwick & West LLP (57) ABSTRACT

An eye tracking unit that includes one or more transmitters that transmit a signal (e.g., a radar signal or an ultrasonic sound) at an eye, one or more receivers that receive a reflection of the signal generated by interaction of the signal with the eye, and an eye orientation estimation module that estimates an orientation of the eye based on the reflected signal received by the one or more ultrasonic receivers and based on a model of the eye. The eye tracking unit may be part of a head-mounted display (HMD) that includes a display element configured to display content to a user wearing the HMD. The model of the eye may be trained by displaying a visual indicator on the electronic element and detecting a reflected signal corresponding to the eye looking at the visual indicator.

20 Claims, 6 Drawing Sheets

(51) Int. Cl.
*G01S 7/539* (2006.01)
*G02B 27/01* (2006.01)
*H04N 13/383* (2018.01)

(58) Field of Classification Search
CPC ...... A61F 2009/00872; G02B 27/0087; G02B 27/0081; A61B 3/113; A61B 8/00; H04B 13/005; G05B 2219/35503; G05B 2219/37269; G06K 2209/05; Y10S 128/916; H04N 13/383
See application file for complete search history.

(56) References Cited

U.S. PATENT DOCUMENTS

| | | | | |
|---|---|---|---|---|
| 9,354,445 | B1* | 5/2016 | Weaver | G06F 3/013 |
| 2002/0049381 | A1* | 4/2002 | Eck | G01S 15/8915 |
| | | | | 600/447 |
| 2013/0144171 | A1* | 6/2013 | Watson | A61B 8/13 |
| | | | | 600/452 |
| 2015/0062321 | A1* | 3/2015 | Mankowski | G01S 7/539 |
| | | | | 348/78 |
| 2015/0321606 | A1* | 11/2015 | Vartanian | B60R 1/00 |
| | | | | 348/148 |
| 2016/0026253 | A1* | 1/2016 | Bradski | H04N 13/344 |
| | | | | 345/8 |
| 2016/0202756 | A1* | 7/2016 | Wu | G06F 3/013 |
| | | | | 382/103 |
| 2017/0099481 | A1* | 4/2017 | Held | G02B 27/017 |
| 2017/0123487 | A1* | 5/2017 | Hazra | G06F 1/163 |
| 2017/0371038 | A1* | 12/2017 | Cheatham, III | G01S 7/52003 |
| 2018/0239136 | A1* | 8/2018 | Ishikawa | G02B 27/0179 |
| 2019/0108676 | A1* | 4/2019 | Holz | G06T 7/593 |

OTHER PUBLICATIONS

Dr. Schwiegerling, Eye Axis, Journal of Refractive Surgery, 2013, vol. 29, No. 8, 515-516 (Year: 2013).*
Journal of Refractive Surgery, vol. 29 No. 8 pp. 515-516 (Year: 2013).*

* cited by examiner

ULTRASOUND/RADAR FOR EYE TRACKING

RELATED APPLICATIONS

This application claims the benefit of U.S. Provisional Patent Application No. 62/306,705 filed on Mar. 11, 2016, the content of which is incorporated by reference in its entirety herein.

BACKGROUND

The present disclosure generally relates to eye tracking, and specifically relates to using ultrasound and/or radar for eye tracking in virtual reality and/or augmented reality applications.

Eye tracking refers to the process of detecting the direction of a user's gaze, which may detect angular orientation of the eye in 3-dimensional (3D) space. Additionally, eye tracking may detect a location of the eye (e.g., the center of the eye), a torsion (i.e., the roll of the eye about the pupillary axis) of the eye, a shape of the eye, a current focal distance of the eye, a dilation of the pupil, or other features of the eye's state. One conventional technique for eye tracking captures video images of a user and identifies an orientation of the user's pupils using a machine vision algorithm. However, this technique consumes substantial computing resources, and is susceptible to occlusion of the eye by eyelashes and eyelids. Furthermore, this method is affected by contrast between the iris and the pupil, which may vary for different users. Thus, video based pupil tracking may not be able to accurately track the eyes of a user with dark irises. Capturing video images of a user to determine the direction of the user's gaze in a virtual reality headset has additional drawbacks. For example, types of cameras for capturing images for capturing images from which an orientation of a user's pupil may be determined are typically relatively expensive or large. Similarly, such a technique may place constraints on the proximity of the camera to the user's eye, which places constraints on the device used for eye tracking. However, when performing eye tracking in a virtual reality environment, using a detection element that is small and relatively close to the user's eye for eye tracking may be preferred. Additionally, video based eye tracking cannot track orientation of a user's eye while the user's eye is closed (e.g., when the user is blinking).

SUMMARY

An eye tracking unit configured to track one or both eyes of a user. The eye tracking unit includes one or more transmitters that transmit a signal (e.g., a radar signal or an ultrasonic sound) at an eye of the user, one or more receivers that receive a reflection of the signal generated by interaction of the signal with the eye, and an eye orientation estimation module that estimates an orientation of the eye based on the reflected signal received by the one or more ultrasonic receivers and based on a model of the eye. The eye tracking unit may be part of a head-mounted display (HMD) that includes a display element configured to display content to a user wearing the HMD. The model of the eye may be trained by displaying a visual indicator on the electronic element and detecting a reflected signal corresponding to the eye looking at the visual indicator.

The eye tracking unit may include receivers and transmitters for both eyes of the user. The transmitters, the receivers, or both may operate as a phased array. In some embodiments, one or more of the receivers and/or transmitters are transceivers. A transceiver may operate as a transmitter or a receiver.

The eye tracking unit may estimate a direction of a pupillary axis of the eye and estimate a direction of a foveal axis of the eye based on the estimated direction of the pupillary axis and based on an offset between the pupillary axis and the foveal axis. The orientation estimation module may be configured to estimate the orientation of the eye based in part on a detected position of a feature of the eye. For example, the feature may be the curvature of the cornea, the cornea-sclera interface, iris features beneath the cornea, and/or the vertex of the cornea.

The eye orientation estimation module may be configured to estimate the orientation of the eye based in part on determining a yaw, pitch, and roll rotation for the eye and a 3-dimensional translation vector for the eye. In some embodiments, the eye orientation module determines velocity information for the eye based Doppler frequency shifts in the reflected signal (e.g., the echo of an ultrasonic signal or the reflected radar signal). The eye orientation module may estimate the orientation of the eye based on this velocity information. In another embodiment, the eye orientation module may determine one or more cross-sectional scans for the eye based on the reflected signal and may estimate the orientation of the eye based on the one or more cross-sectional scans.

The figures depict embodiments of the present disclosure for purposes of illustration only. One skilled in the art will readily recognize from the following description that alternative embodiments of the structures and methods illustrated herein may be employed without departing from the principles of the disclosure described herein.

DETAILED DESCRIPTION

System Overview

Figure 1:
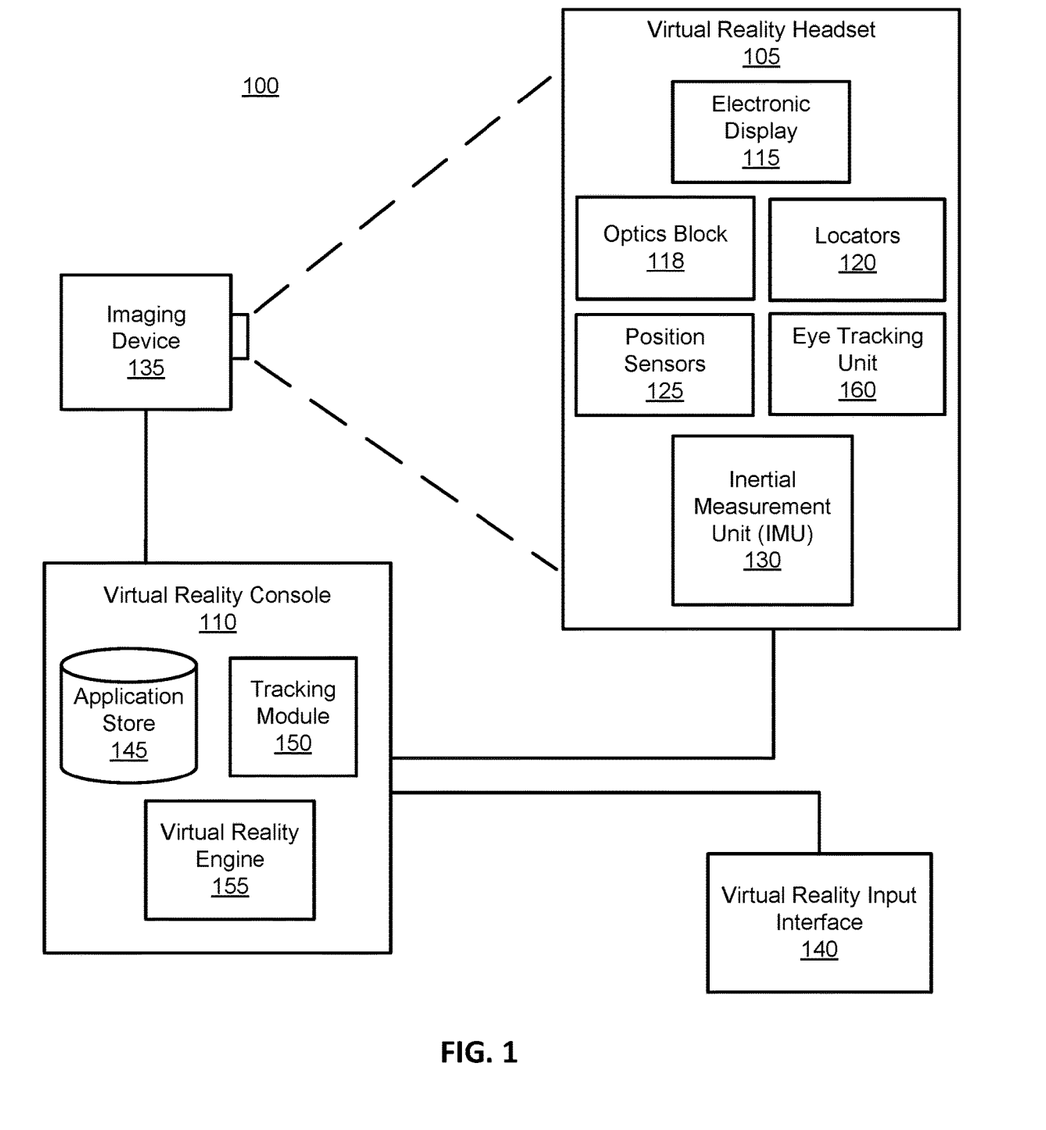
FIG. 1 is a diagram of a system environment including a virtual reality system, in accordance with an embodiment.

FIG. 1 is a block diagram of a virtual reality (VR) system environment 100 in which a VR console 110 operates. The system environment 100 shown by FIG. 1 comprises a VR headset 105, an imaging device 135, and a VR input interface 140 that are each coupled to the VR console 110. While FIG. 1 shows an example VR system environment 100 including one VR headset 105, one imaging device 135, and one VR input interface 140, in other embodiments any number of these components may be included in the VR system environment 100. For example, there may be multiple VR headsets 105 each having an associated VR input interface 140 and being monitored by one or more imaging devices 135, with each VR headset 105, VR input interface 140, and imaging devices 135 communicating with the VR console 110. In alternative configurations, different and/or additional components may be included in the VR system environment 100. Similarly, functionality of one or more of the components may be distributed among the components in a different manner than is described here. For example, some or all of the functionality of the VR console 110 may be contained within the VR headset 105.

The VR headset 105 is a head-mounted display that presents content to a user. Examples of content presented by the VR headset 105 include one or more images, video, audio, or some combination thereof. In some embodiments, audio is presented via an external device (e.g., speakers and/or headphones) that receives audio information from the VR headset 105, the VR console 110, or both, and presents audio data based on the audio information. Some embodiments of the VR headset 105 are further described below in conjunction with FIGS. 2 and 3. The VR headset 105 may comprise one or more rigid bodies, which may be rigidly or non-rigidly coupled to each other. A rigid coupling between rigid bodies causes the coupled rigid bodies to act as a single rigid entity. In contrast, a non-rigid coupling between rigid bodies allows the rigid bodies to move relative to each other. In some embodiments, the VR headset 105 may also act as an augmented reality (AR) headset. When the VR headset acts as an AR headset, the VR headset 105 augments views and of a physical, real-world environment with computer-generated elements (e.g., images, video, sound, etc.).

The VR headset 105 includes an electronic display 115, an optics block 118, one or more locators 120, one or more position sensors 125, an inertial measurement unit (IMU) 130, and an eye tracking unit 160. Some embodiments of the VR headset 105 have different components than those described here. Similarly, the functionality of various components may be distributed among other components in the VR system environment 100 in a different manner than is described here in various embodiments. For example, some of the functions of the eye tracking unit 160 may be performed by the VR console 110.

The electronic display 115 displays images to the user in accordance with data received from the VR console 110. In various embodiments, the electronic display 115 may comprise a single electronic display or multiple electronic displays (e.g., a display for each eye of a user). Examples of the electronic display 115 include: a liquid crystal display (LCD), an organic light emitting diode (OLED) display, an active-matrix organic light-emitting diode display (AMO-LED), some other display, or some combination thereof.

The optics block 118 magnifies image light received from the electronic display 115, corrects optical errors associated with the image light, and the corrected image light is presented to a user of the VR headset 105. In various embodiments, the optics block 118 includes one or more optical elements. Example optical elements include: an aperture, a Fresnel lens, a convex lens, a concave lens, a filter, or any other suitable optical element that affects the image light emitted from the electronic display 115. Moreover, the optics block 118 may include combinations of different optical elements. In some embodiments, one or more of the optical elements in the optics block 118 may have one or more coatings, such as partial reflectors or anti-reflective coatings.

Magnification of image light by the optics block 118 allows the electronic display 115 to be physically smaller, weigh less, and consume less power than larger displays. Additionally, magnification may increase a field of view of the displayed content. For example, the field of view of the displayed content is such that the displayed content is presented using almost all (e.g., 110° diagonal), and in some cases all, of the user's field of view. In some embodiments, the optics block 118 is designed so its effective focal length is larger than the spacing to the electronic display 115, which magnifies image light projected by the electronic display 115. Additionally, in some embodiments, the amount of magnification may be adjusted by adding or removing optical elements from the optics block 118.

The optics block 118 may be designed to correct one or more types of optical error. Examples of optical error include: two dimensional optical errors, three dimensional optical errors, or some combination thereof. Two dimensional errors are optical aberrations that occur in two dimensions. Example types of two dimensional errors include: barrel distortion, pincushion distortion, longitudinal chromatic aberration, transverse chromatic aberration, or any other type of two-dimensional optical error. Three dimensional errors are optical errors that occur in three dimensions. Example types of three dimensional errors include spherical aberration, comatic aberration, field curvature, astigmatism, or any other type of three-dimensional optical error. In some embodiments, content provided to the electronic display 115 for display is pre-distorted, and the optics block 118 corrects the distortion when it receives image light from the electronic display 115 generated based on the content.

The locators 120 are objects located in specific positions on the VR headset 105 relative to one another and relative to a specific reference point on the VR headset 105. A locator 120 may be a light emitting diode (LED), a corner cube reflector, a reflective marker, a type of light source that contrasts with an environment in which the VR headset 105 operates, or some combination thereof. In embodiments where the locators 120 are active (i.e., an LED or other type of light emitting device), the locators 120 may emit light in the visible band (~380 nm to 750 nm), in the infrared (IR) band (~750 nm to 1700 nm), in the ultraviolet band (10 nm to 380 nm), in some other portion of the electromagnetic spectrum, or in some combination thereof.

In some embodiments, the locators 120 are located beneath an outer surface of the VR headset 105, which is transparent to the wavelengths of light emitted or reflected by the locators 120 or is thin enough not to substantially attenuate the wavelengths of light emitted or reflected by the locators 120. Additionally, in some embodiments, the outer surface or other portions of the VR headset 105 are opaque in the visible band of wavelengths of light. Thus, the locators 120 may emit light in the IR band under an outer surface that is transparent in the IR band but opaque in the visible band.

The IMU 130 is an electronic device that generates fast calibration data based on measurement signals received from one or more of the position sensors 125. A position sensor 125 generates one or more measurement signals in response to motion of the VR headset 105. Examples of position sensors 125 include: one or more accelerometers, one or more gyroscopes, one or more magnetometers, another suitable type of sensor that detects motion, a type of sensor used for error correction of the IMU 130, or some combination thereof. The position sensors 125 may be located external to the IMU 130, internal to the IMU 130, or some combination thereof.

Based on the one or more measurement signals from one or more position sensors 125, the IMU 130 generates fast calibration data indicating an estimated position of the VR headset 105 relative to an initial position of the VR headset 105. For example, the position sensors 125 include multiple accelerometers to measure translational motion (forward/back, up/down, left/right) and multiple gyroscopes to measure rotational motion (e.g., pitch, yaw, roll). In some embodiments, the IMU 130 rapidly samples the measurement signals and calculates the estimated position of the VR headset 105 from the sampled data. For example, the IMU 130 integrates the measurement signals received from the accelerometers over time to estimate a velocity vector and integrates the velocity vector over time to determine an estimated position of a reference point on the VR headset 105. Alternatively, the IMU 130 provides the sampled measurement signals to the VR console 110, which determines the fast calibration data. The reference point is a point that may be used to describe the position of the VR headset 105. While the reference point may generally be defined as a point in space, in practice the reference point is often defined as a point within the VR headset 105 (e.g., a center of the IMU 130).

The IMU 130 receives one or more calibration parameters from the VR console 110. As further discussed below, the one or more calibration parameters are used to maintain tracking of the VR headset 105. Based on a received calibration parameter, the IMU 130 may adjust one or more IMU parameters (e.g., sample rate). In some embodiments, certain calibration parameters cause the IMU 130 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The eye tracking unit 160 estimates an angular orientation of the user's eye. The angular orientation of the eye corresponds to a direction of the user's gaze within the VR headset 105 and is defined herein as the direction of the foveal axis, which is the axis between a fovea (an indentation on the retina of the eye) of the eye and a center of the eye's pupil. In general, when a user's eyes are fixed on a point, the foveal axes of the user's eyes intersect that point. The eye also includes a pupillary axis, which is the axis passing through the center of the pupil, which is perpendicular to the corneal surface. Generally, the pupillary axis does not directly align with the foveal axis. Both the pupillary and foveal axes intersect at the center of the pupil, but the orientation of the foveal axis is offset from the pupillary axis by approximately −1° to 8° laterally and ±4° vertically. Because the foveal axis is defined relative to the fovea, which is located in the back of the eye, detection of the foveal axis may is difficult or impossible when using certain methods of eye tracking. Accordingly, in some embodiments, the eye tracking unit 160 detects an orientation of the pupillary axis and estimates the foveal axis based on the detected pupillary axis. Alternately, the eye tracking unit 160 estimates the foveal axis by directly detecting a location of the fovea or of other features of the eye's retina.

In general, movement of an eye corresponds to an angular rotation of the eye, as well as a translation of the eye, a change in the torsion of the eye, or a change in shape of the eye. The eye tracking unit 160 may also detect translation of the eye, which is a change in the position of the eye relative to the eye socket. In some embodiments, translation of the eye is not directly detected, but is approximated based on a mapping from a detected angular orientation. Translation of the eye corresponding to a change in the eye's position relative to one or more components of the eye tracking unit 160 may also be detected. Translation of the eye relative to one or more components of the eye tracking unit 160 may occur when a position of the VR headset 105 of a user's head shifts. The eye tracking unit 160 may also detect torsion of the eye, which is rotation of the eye about the pupillary axis. The eye tracking unit 160 may use detected torsion of the eye to estimate orientation of the foveal axis based on a detected pupillary axis. The eye tracking unit 160 may also track a change in the shape of the eye, which may be approximated as a skew, a scaling linear transform, or a twisting distortion (e.g., due to torsional deformation). Based on a combination of the angular orientation of the pupillary axis, the translation of the eye, the torsion of the eye, and the current shape of the eye tracking unit 160 may estimate the foveal axis.

To estimate orientation of the user's eye, the eye tracking unit 160 includes one or more transmitters that produce ultrasound signals or radar signals, which are reflected by the eye. The reflected signals are detected by one or more receivers included in the eye tracking unit 160. In some embodiments, eye tracking unit 160 includes transceivers that act as both the transmitters and the receivers. The reflected signal indicates shape, movement, and orientation of the eye, and processing the reflected signal enables determination of the eye's orientation. Generating one or more signals transmitted toward the eye and detecting one or more resultant reflected signals is denoted herein as "scanning" the eye. The eye tracking unit 160 processes the reflected signals to generate a set of "scans," which may be used to estimate the orientation of the user's eye. Unlike conventional eye tracking systems, an ultrasound or a radar eye tracking system may track the eye when the eye is closed (e.g., when the user is blinking).

The eye tracking unit 160 may include a set of transmitters, receivers, and/or transceivers for the left eye of the user and an additional set of transmitters, receivers, and/or transceivers for the right eye of the user. In some embodiments, the transceivers are piezoelectric or capacitive transducers that emit ultrasound. Alternatively, the transceivers are antennas that transmit electromagnetic signals (e.g., in the X band) to implement a radar system. As orientation of both eyes of the user may be determined, the eye tracking unit 160 is able to determine where the user is looking. Based on the orientation of the eye, the VR headset 105 may: determine an inter-pupillary distance (IPD) of the user, introduce depth cues (e.g., blur image outside of the user's main line of sight), perform another function based at least in part on the orientation of at least one of the user's eyes, or some combination thereof. The eye tracking unit 160 is further described below in conjunction with FIGS. 3 and 4.

The imaging device 135 generates slow calibration data in accordance with calibration parameters received from the VR console 110. Slow calibration data includes one or more images showing observed positions of the locators 120 that are detectable by the imaging device 135. The imaging device 135 may include one or more cameras, one or more video cameras, any other device capable of capturing images including one or more of the locators 120, or some combination thereof. Additionally, the imaging device 135 may include one or more filters (e.g., used to increase signal to noise ratio). The imaging device 135 is configured to detect light emitted or reflected from locators 120 in a field of view of the imaging device 135. In embodiments where the locators 120 include passive elements (e.g., a retroreflector), the imaging device 135 may include a light source that illuminates some or all of the locators 120, which retroreflect the light towards the light source in the imaging device 135. Slow calibration data is communicated from the imaging device 135 to the VR console 110, and the imaging device 135 receives one or more calibration parameters from the VR console 110 to adjust one or more imaging parameters (e.g., focal length, focus, frame rate, ISO, sensor temperature, shutter speed, aperture, etc.).

The VR input interface 140 is a device that allows a user to send action requests to the VR console 110. An action request is a request to perform a particular action. For example, an action request may be to start an application, to end an application, or to perform a particular action within the application. The VR input interface 140 may include one or more input devices. Example input devices include: a keyboard, a mouse, a game controller, or any other suitable device for receiving action requests and communicating the received action requests to the VR console 110. An action request received by the VR input interface 140 is communicated to the VR console 110, which performs an action corresponding to the action request. In some embodiments, the VR input interface 140 provides haptic feedback to the user in accordance with instructions received from the VR console 110. For example, haptic feedback is provided when an action request is received or when the VR input interface 140 receives instructions from the VR console 110 causing the VR input interface 140 to generate haptic feedback when the VR console 110 performs an action.

The VR console 110 provides content to the VR headset 105 for presentation to the user in accordance with information received from one or more of: the imaging device 135, the VR headset 105, and the VR input interface 140. In the example shown in FIG. 1, the VR console 110 includes an application store 145, a tracking module 150, and a virtual reality (VR) engine 155. Some embodiments of the VR console 110 have different modules than those described in conjunction with FIG. 1. Similarly, the functions further described below may be distributed among modules of the VR console 110 in a different manner than described here.

The application store 145 stores one or more applications for execution by the VR console 110. An application is a group of instructions, that when executed by a processor, generates content for presentation to the user. Content generated by an application may be in response to inputs received from the user via movement of the VR headset 105 or the VR input interface 140. Examples of applications include: gaming applications, conferencing applications, video playback application, or other suitable applications.

The tracking module 150 calibrates the VR system environment 100 using one or more calibration parameters and may adjust one or more calibration parameters to reduce error in determining of the position of the VR headset 105 or of the VR input interface 140. For example, the tracking module 150 adjusts the focus of the imaging device 135 to obtain a more accurate position for observed locators on the VR headset 105. Moreover, calibration performed by the tracking module 150 also accounts for information received from the IMU 130. Additionally, if tracking of the VR headset 105 is lost (e.g., the imaging device 135 loses line of sight of at least a threshold number of the locators 120 on the VR headset 105), the tracking module 150 re-calibrates some or all of the VR system environment 100.

The tracking module 150 tracks movements of the VR headset 105 using slow calibration information from the imaging device 135. For example, the tracking module 150 determines positions of a reference point of the VR headset 105 using observed locators from the slow calibration information and a model of the VR headset 105. The tracking module 150 also determines positions of a reference point of the VR headset 105 using position information from the fast calibration information. Additionally, in some embodiments, the tracking module 150 may use portions of the fast calibration information, the slow calibration information, or some combination thereof, to predict a future location of the VR headset 105. The tracking module 150 provides the estimated or predicted future position of the VR headset 105 to the VR engine 155.

The VR engine 155 executes applications within the VR system environment 100 and receives position information, acceleration information, velocity information, predicted future positions, or some combination thereof of the VR headset 105 from the tracking module 150. Based on the received information, the VR engine 155 determines content to provide to the VR headset 105 for presentation to the user. For example, if the received information indicates that the user has looked to the left, the VR engine 155 generates content for the VR headset 105 that mirrors the user's movement in a virtual environment. Additionally, the VR engine 155 performs an action within an application executing on the VR console 110 in response to an action request received from the VR input interface 140 and provides feedback to the user that the action was performed. The provided feedback may be visual or audible feedback via the VR headset 105 or haptic feedback via the VR input interface 140.

Figure 2:
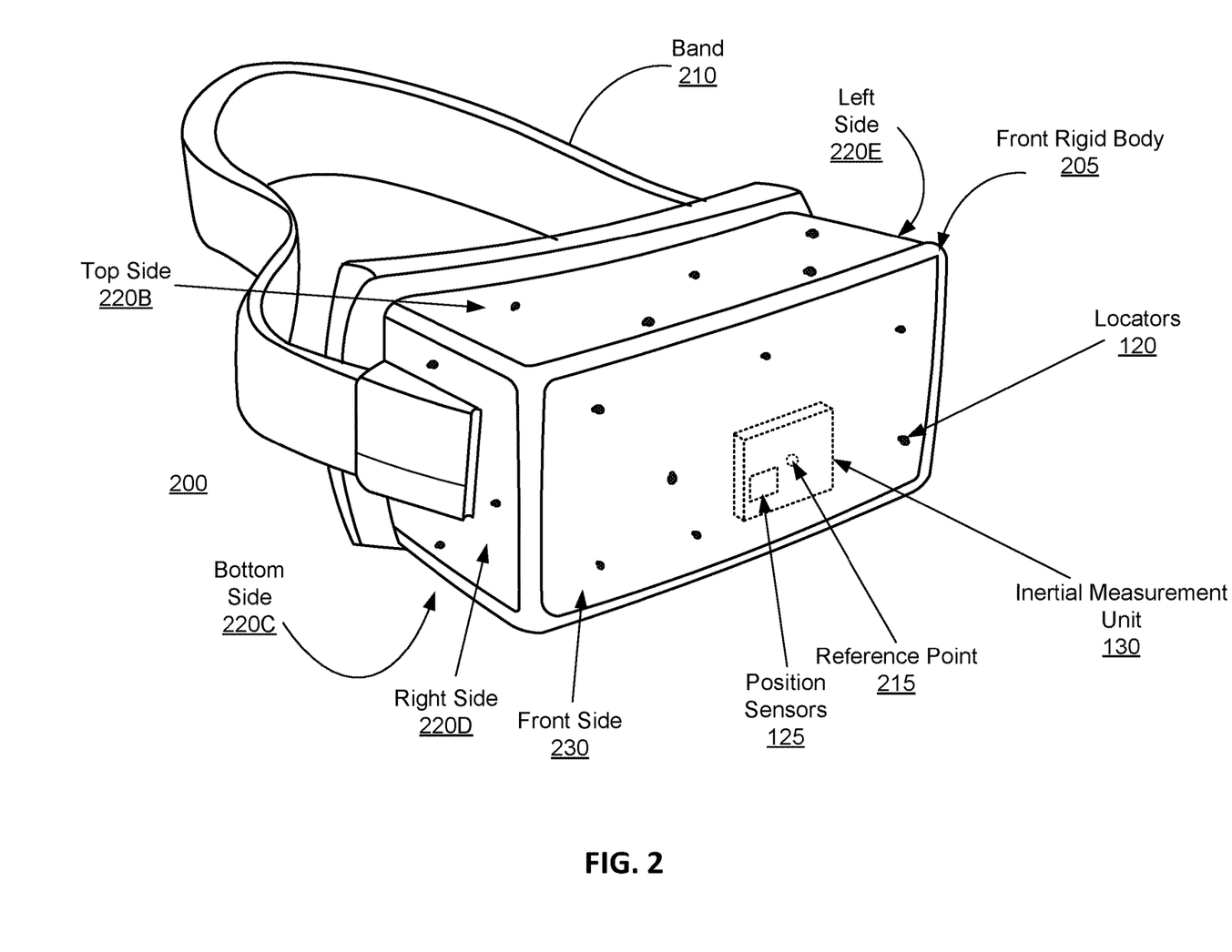
FIG. 2 is a diagram of a virtual reality headset, in accordance with an embodiment.

FIG. 2 is a diagram of a virtual reality (VR) headset, in accordance with an embodiment. The VR headset 200 is an embodiment of the VR headset 105, and includes a front rigid body 205 and a band 210. The front rigid body 205 includes an electronic display element of the electronic display 115 (not shown in FIG. 2), the optics block 118 (not shown in FIG. 2), the IMU 130, the one or more position sensors 125, an eye tracking unit 160 (not shown in FIG. 2), and the locators 120. In the embodiment shown by FIG. 2, the position sensors 125 are located within the IMU 130, and neither the IMU 130 nor the position sensors 125 are visible to the user.

The locators 120 are located in fixed positions on the front rigid body 205 relative to one another and relative to a reference point 215. In the example of FIG. 2, the reference point 215 is located at the center of the IMU 130. Each of the locators 120 emit light that is detectable by the imaging device 135. The locators 120, or portions of the locators 120, are located on a front side 220A, a top side 220B, a bottom side 220C, a right side 220D, and a left side 220E of the front rigid body 205 in the example of FIG. 2.

Figure 3:
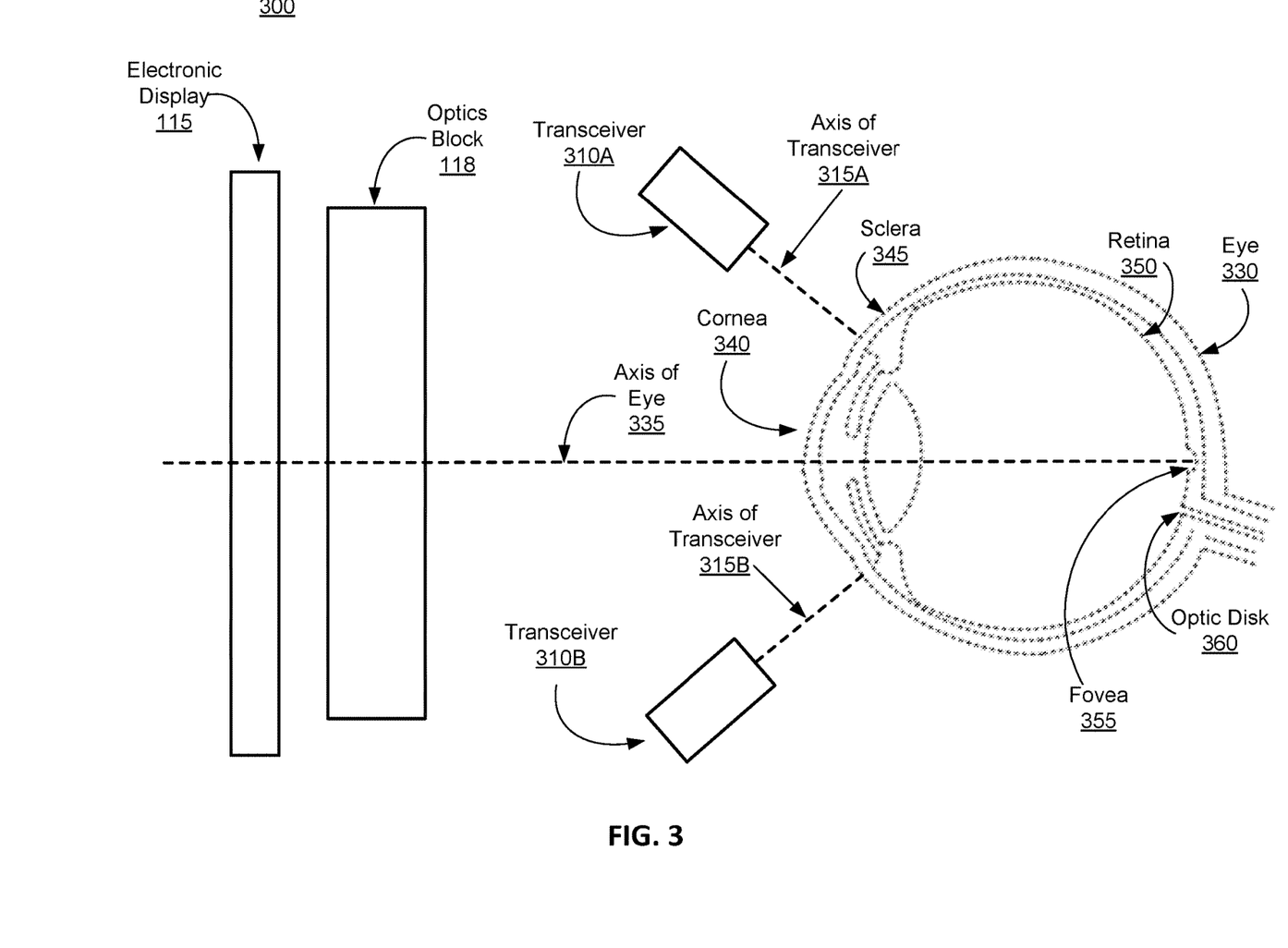
FIG. 3 is a diagram of an eye tracking system including two transceivers, in accordance with an embodiment.

FIG. 3 depicts an eye tracking system 300 that tracks the position of the user's eye 330 by repeatedly scanning the eye 330. For purposes of illustration, FIG. 3 depicts a cross-section of the eye 330. In some embodiments, the eye tracking system 300 is part of the eye tracking unit 160. The eye tracking system 300 illustrated in FIG. 3 includes two transceivers 310A, 310B. While FIG. 3 shows an embodiment where the two transceivers 310A, 310B detect the orientation of a single eye 330, in alternate embodiments, a different number of transceivers may be employed. Similarly, a set of transceivers may monitor the user's right eye and another set of transceivers may monitor the user's left eye. In some embodiments, the eye tracking system 300 includes one or more receivers and one or more transmitters, rather than transceivers.

The transceivers 310A, 310B are ultrasonic transducers or electromagnetic antennas in various embodiments. The transceivers 310A, 310B both transmit and receive signals. Transmitting and receiving ultrasound or radar allows the transceivers 310A, 310B to scan the eye 330. Herein, $\{x_1(t), \ldots, x_N(t)\}$ denotes the set of N signals transmitted by the transceivers 310A, 310B and $\{y_1(t), \ldots, y_R(t)\}$ denotes the set of R signals received by the transceivers 310A, 310B. In the embodiment depicted in FIG. 3, each transceiver 310A, 310B transmits and receives two signals (i.e., N=R=2). For example, the transceivers 310A, 310B each transmit two transmitted signals: $x_1(t)$ and $x_2(t)$. The transmitted signals may be pulses. The transceivers 310A, 310B each receive signals that are echoes of pulses comprising the transmitted signals. In some embodiments, signals transmitted by each of the transceivers 310A, 310B have a low cross-correlation (i.e., $|\int x_1(t) x_2(t+\tau) dt| \ll |\int x_1(t) dt \int x_2(t) dt|$ for all $\tau$). In such an embodiment, the echoes of the two transmitted signals can be differentiated by signal processing methods. Accordingly, the component in a received signal, $y_i(t)$, which is an echo of $x_1(t)$ or $x_2(t)$, may be determined.

In some embodiments, the transceivers 310A, 310B are ultrasonic transceivers. Examples of ultrasonic transceivers 310A, 310B include: piezoelectric transducers or capacitive transducers that emit ultrasound in the range used in conventional ultrasonography systems (1-18 MHz). In some embodiments, high frequency ultrasound is used (e.g., 50-100 MHz). Alternatively, the transceivers 310A, 310B may be radar antennas. These transceivers 320A, 320B may operate in the X band frequency (8.0 to 12.0 GHz) or any other band suitable for radar. In some embodiments, the antennas may be directional antennas.

The transceivers 310A, 310B may transmit signals on a continuous (e.g., wideband) spectrum. In some embodiments, the transceivers 310A, 310B transmit signals having a single frequency or within a narrowband spectrum of ultrasound or electromagnetic radiation. Alternatively, the transceivers 310A, 310B transmit multiple narrow band frequencies.

FIG. 3 shows a cross-section of a user's eye 330, which includes a cornea 340, a sclera 345, a retina 350, a fovea 355, and an optic disk 360. The cornea 340 is transparent in the visible band (~380 nm to 750 nm) of the electromagnetic spectrum and is a curved surface covering an iris and a pupil of the eye 330. The sclera 345 is an opaque outer portion of the eye 330 including collagen and elastic fiber. In some embodiments, the transceivers 310A, 310B transmit signals towards both the cornea 340 and the sclera 345 of the eye 330. Because the cornea 340 projects outward from the approximately ellipsoidal sclera 345, the eye tracking unit 160 may estimate an angular orientation of the eye 330 by detecting a position of the cornea 340. In some embodiments, propagation characteristics of a signal or of different signals may be used to determine the position of the cornea 340. For example, if the cornea 340 and the sclera 345 have different indices of refraction for ultrasound of frequency $f_1$, differing amplitudes of sound reflected by the cornea 340 and the sclera 345 may be used to distinguish between the cornea 340 and the sclera 345. Similarly, if the cornea 340 or the sclera 345 have different indices of refraction at a first frequency $f_1$ and at a second frequency $f_2$, a variation in reflected energy between the two frequencies may be used to distinguish between signals reflected by the cornea 340 and by the sclera 345.

The retina 350 is an inner layer at the back of the eye 330 that is sensitive to light and includes the fovea 355, which is a depression in the retina 350 positioned along the axis 335 of the eye 330 and including closely packed cones providing sharp central vision to the user. The axis 335 of the eye 330 is an orientation of the eye 330 that changes as the eye 330 moves. In FIG. 3, the eye 330 is depicted in its centered position (i.e., looking straight ahead), so the axis 335 of the eye 330 in FIG. 3 is the center axis of the eye. FIG. 3 also shows the optical disk 360 of the eye 330, which is the location where the optic nerve connects to the eye 330 and also corresponds to a blind spot of the eye 330.

FIG. 3 also depicts the axes of the transceivers 315A, 315B. The axis of a transceiver 315A is the center of the primary beam or signal that the transceiver 310A emits while active. When the transceiver 310A emits either ultrasound or electromagnetic radiation, a majority of the electromagnetic emitted by the transceiver 310A is included in the primary beam (also known as a "main lobe"). The transceiver 310A may also be more sensitive to signals originating from sources within its primary beam. For example, a transceiver 310A includes one or more directional ultrasonic transducers or antennas. In some embodiments, the transceivers 310A, 310B are roughly omnidirectional, so they do not have a primary beam; accordingly, in embodiments where the transceivers 310A, 310B do not have a primary beam, there are no axes of the transceivers 315A, 315B.

Figure 4:
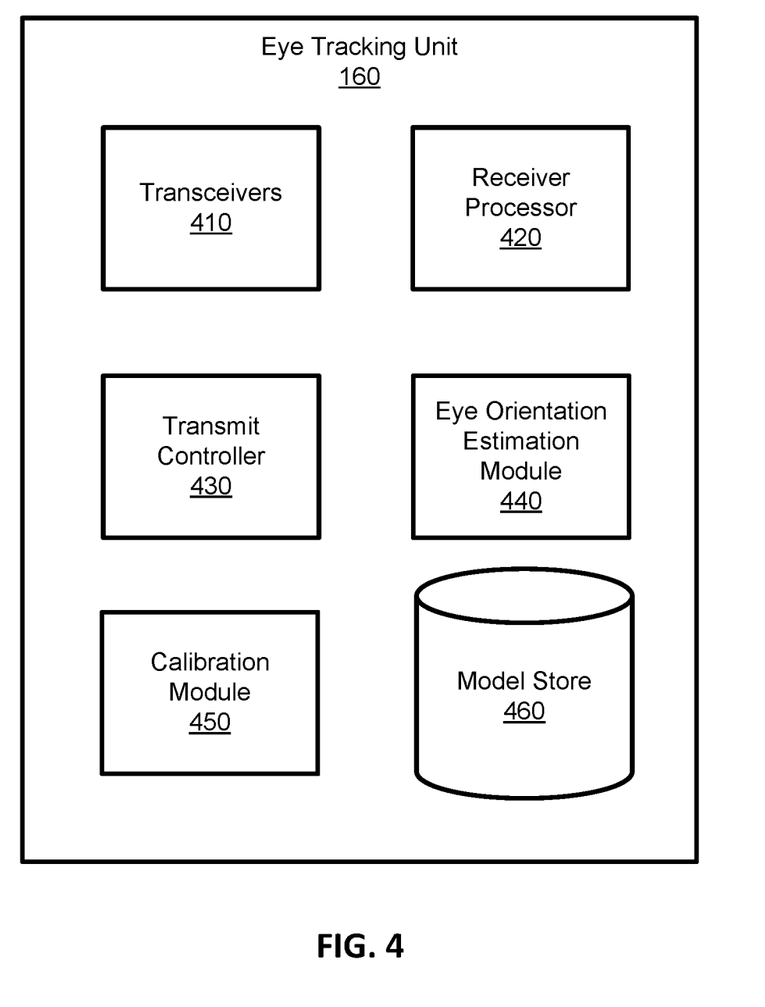
FIG. 4 is a block diagram of an eye tracking unit, in accordance with an embodiment.

FIG. 4 is a block diagram illustrating of an eye tracking unit 160 according to one embodiment. Some embodiments of the eye tracking unit 160 have different or additional components than those described in conjunction with FIG. 4. Similarly, the functionality described in conjunction with FIG. 4 may be distributed among the components in different manners than described in conjunction with FIG. 4. The eye tracking unit 160 includes one or more transceivers 410, a receiver processor 420, a transmit controller 430, an eye orientation estimation module 440, a calibration module 450, and a model store 460. In some embodiments, the eye tracking unit 160 is included in the VR headset 105. Alternatively, the eye tracking unit 160 is included in another system that tracks user eye movement. The eye tracking unit 160 may track both eyes of a user. However, as in FIG. 3, the eye tracking unit 160 is described herein with respect to a single eye (e.g., eye 330).

The model store 460 is a memory that stores a model, M, of a user's eye, which is used in conjunction with one or more scans of the eye to estimate the current orientation of the eye. In various embodiments, the model store 460 is a memory, such as a ROM, DRAM, SRAM, flash memory unit, hard disk drive, or some combination thereof. The model store 460 may be part of a larger digital memory of the virtual reality (VR) system environment 100. The model, M, stored in the model store 460 may be a 3D model of the eye's surface or a 3D volume of a portion of the eye. In embodiments in which both of a user's eyes are scanned, the model store 460 may include models $M_1$ and $M_2$ for each eye.

In some embodiments, the model is a 3D model that approximates a surface geometry (i.e., a 2-dimensional (2D) surface embedded in 3D space) of the eye or a 3D structure of a volume of the eye. The 3D model may define two orthogonal axes about which the model of the eye rotates. Thus, the 3D model may incorporate two angles, $\alpha$ (yaw) and $\beta$ (pitch), which specify the orientation of the eye relative to a centered orientation of the eye (i.e., $\alpha=\beta=0°$ corresponds to the eye looking straight ahead). $\alpha$ and $\beta$ may correspond to the angular direction of the foveal axis. The model, M, may also incorporate a roll angle, $\gamma$ corresponding to a roll of the eye (i.e., the torsion). Additionally, the model, M, may further incorporate a translation vector $[x_0, y_0, z_0]^T$ that specifies a translation of the 3D model in a Cartesian coordinate system. In some embodiments, the angle of the pupillary axis or $(\alpha, \beta)$ is mapped to the translation vector, $[x_0, y_0, z_0]^T$. In some embodiments, the foveal axis is calculated based on the angle of the pupillary axis, the translation vector, the roll angle, and a parameter corresponding to the location of the fovea stored in the model, M. A yaw rotation corresponds to a horizontal saccade (eye movement) and a pitch rotation corresponds to vertical saccade. Tracking the eye may comprise determining values of $\alpha$ and $\beta$ that cause the 3D model of the eye to most closely fit the scanned portion of the eye. In some embodiments, the eye is tracked by matching the scanned portion of the eye to the model, M, using some combination pitch, yaw, the angle of the pupillary axis, the translation vector, and the roll angle.

The model, M, may be a mathematical model of the 2D surface of the eye embedded in 3D space. M may be continuous, or may consist of discrete points. In some embodiments, M is encoded in Cartesian space, where the x, y, and z axes correspond to a center axis of the eye (e.g., center axis 335 in FIG. 3), a horizontal axis orthogonal to the center axis of the eye, and a vertical axis orthogonal to the horizontal axis, respectively. The model may include a function, $X(y, z)$ representing a surface protruding into the x axis from the y-z plane. In some embodiments, $\alpha$ and $\beta$ correspond to the angles of a rotational transform applied to the surface in $\mathbb{R}^3$. For example, if $(x,y,z)=(0,0,0)$ corresponds to the point of rotation of the model of the eye, the rotational transform is represented by the rotation matrix $R_z(\alpha)R_y(\beta)$, where $R_z(\alpha)$ and $R_y(\beta)$ are yaw and roll matrices, as conventionally defined. The model, M, may also include parameters corresponding to translation of the eye and torsion of the eye. Similarly, M may include a function of polar coordinates having the form $R(\theta, \phi)$. If the origin of the polar coordinate system is defined as the point about which the eye rotates, the model, M, of the surface of the eye is specified by $R(\theta-\alpha, \phi-\beta)$. The surface represented by the model M may be a surface other than the outer surface of the eye. For example, the model M may represent a surface of the retina. In some embodiments, the model, M, includes multiple surfaces such as, a surface corresponding to the exterior of the eye, a surface corresponding to a portion of the lens of the eye, and a surface corresponding to the retina of the eye.

The model, M, may be a mathematical model of the 3D volume of the eye. In various embodiments, the model M, may be continuous, or may be a set of discrete points. For example, the model, M, is encoded in a Cartesian coordinate system and represented by a function, $D(x, y, z)$. A rotation matrix, $R_z(\alpha)R_y(\beta)$, may be used to rotate the 3D model for a given yaw and pitch rotation. Similarly, the model, M, may include a function of polar coordinates having the form $D(r, \theta, \phi)$. If the origin of the polar coordinate system is defined as the point about which the eye rotates, the 3D model of the eye may be given by $D(r, \theta-\alpha, \phi-\beta)$.

The value returned by the function $D(\ldots)$ (e.g., $D(x, y, z)$ or $D(r, \theta, \phi)$) for a point (e.g., $(x, y, z)$ or $(r, \theta, \phi)$) may be indicative of an index of refraction, a rate of acoustic attenuation (e.g., in dB/cm), a rate of scattering, a rate of change of the index of refraction (e.g., a magnitude of a gradient of a function of the index of refraction or a component of the gradient in a certain direction), or some combination thereof. The index of refraction, the rate of acoustic attenuation, and the rate of scattering are functions of the frequency of the signal emitted by a transceiver 410. Accordingly, in embodiments in which signals with multiple frequencies are transmitted by a transceiver 410, the model, M, may define a function for each frequency. In embodiments employing wideband ultrasound or radar, the 3D function included in the model, M, may also be function of frequency (e.g., $D(x, y, z, f)$ or $D(r, \theta, \phi, f)$). Alternatively, the model, M, may include a function that is a composite of the band of frequencies.

In some embodiments, the model, M, is an image generating function rather than a mathematical model of a 3D surface or of a 3D structure. The model, M, may be an image generating function, $I_M(\ldots)$ that returns a 2D image for various combination of inputs (e.g., for each combination of inputs). An image returned by $I_M(\ldots)$ may correspond to a cross-section of the eye defined by an intersection of a portion of the eye with a plane specified by the input to the function. For example, $I_M(\ldots)$ is a function of a normal vector and a distance from an origin defining the plane of the cross-section of the eye. For example, the image generating function is: $I_M(\vec{n}, d)$, where $\vec{n}=[n_1, n_2, n_3]^T$ is a unit vector normal to the plane of the cross-section of the eye and d is the distance of the plane from the origin (i.e., the plane of the cross-section is defined as $n_1x+n_2y+n_3z=d$). The image generating function, $I_M(\ldots)$ may select an image from a finite set of images stored in the model store 460. Alternatively, $I_M(\ldots)$ is a continuous function (i.e., approximately continuous, since it is represented via an integer, floating point, or alternative computer-implemented numeral scheme).

In some embodiments, the model, M, comprises a set of images, where each image is mapped to an input or a region of inputs by $I_M(\ldots)$. In alternate embodiments, if the model store 460 does not include an image corresponding to exact values of the inputs of $I_M(\ldots)$, images corresponding to orientations close to the input (e.g., within a threshold amount of the input) may be interpolated together to create a composite image that is returned by the image generating function. The model, M, may comprise a 3D model of the eye used to render a cross-sectional image. The image generating function, $I_M(\ldots)$, may be implemented by generating a cross-section from a mathematical model of the eye, such as a 3D volume or one or more 2D surfaces embedded in $\mathbb{R}^3$.

In some embodiments, rather than a generic surface or a 3D volume, the model, M, includes a number of parameters that approximately specify a shape of the eye. These parameters may specify the shape of the outer surface of eye. For example, the model, M, may include parameters for an average radius of the eye, an average radius of the sclera of the eye, a set of parameters approximating a surface of the sclera as a ellipsoid, a radius of the cornea of the eye, a measurement of an amount of protrusion of the cornea from the sclera, a set of parameters specifying the shape of the cornea, and a point of rotation for the eye. These parameters may also specify an internal structure of the eye (e.g., the location of the fovea, the location of the optical disk, or a thickness of the retina, a thickness of the sclera, and a thickness of the cornea). Additional parameters may be used to account for deviations from an ideal model specified by the parameters. For example, the model, M, accounts for a bulge on the eye's surface caused by a blood vessel via these additional parameters.

The calibration module 450 generates or trains the model, M, prior to eye tracking. For example, the calibration module 450 trains the model, M, during a calibration sequence performed prior to eye tracking. The calibration module 450 comprises instructions that, when executed by one or more processors, a dedicated hardware unit, or some combination thereof cause the one or more processors or dedicated hardware unit to perform the functions further described below. In some embodiments, the calibration module 450 repeatedly scans the eye with the one or more transceivers 410 during the calibration sequence. For example, the user is instructed to look at a certain virtual object or visual indicator displayed on the electronic display 115 of the VR headset 105. A portion of the eye is scanned while the user is looking at the visual indicator, allowing the eye tracking unit 160 to capture sample scans of the eye at known orientations of the eye. These sample scans may be combined into the model, M, stored in the model store 460. After the calibration module 450 generates the model, M, the eye tracking unit 160 may subsequently track the user's eye. In some embodiments, the calibration module 450 updates the model, M, during eye tracking.

In some embodiments, the one or more transceivers 410 are ultrasound transducers that emit one or more ultrasonic signals toward a portion of the eye. Interaction between the ultrasonic signals and the portion of the eye create echoes according to the geometry of the surface of the portion eye or according to the internal geometry and acoustic properties of the portion of the eye. The echoes propagate back to the ultrasound transducers, which convert the echoes into electrical signals. Alternatively, the one or more transceivers 410 are antennas that transmit and receive electromagnetic radar signals (e.g., X band radar). Similar to the ultrasonic signals, the transmitted radar signals are reflected by the eye and absorbed by the eye. The reflected signals are used to determine a shape of a surface of the eye and/or an internal geometry of the eye.

In some embodiments, the transceivers 410 operate as a 1-dimensional (1D) or a 2-dimensional (2D) phased array. The transceivers 410 may operate as a multiple input and multiple output (MIMO) system in which one or more transmitters 410 emit signals that reflect off of the eye and multiple receivers receive the reflected signals. In some embodiments, the transceivers 410 operate with a single transmitter and multiple receivers at a given time. In some embodiments, different transceivers 410 transmit and receive signals at different times.

The transmit controller 430 controls the signals (e.g., ultrasound or electromagnetic radiation) output by the transceivers 410. In various embodiments, the transmit controller 430 comprises instructions that, when executed by one or more processors, a dedicated hardware unit, or some combination thereof cause the one or more processors or dedicated hardware unit to perform the functions further described below. The transmit controller 430 may also include a signal generation subsystem including one or more digital-to-analog converters, one or more oscillators, or one or more amplifiers for driving the transceivers 410. In some embodiments, the transmit controller 430 controls a frequency or a waveform of signals transmitted by the transceivers 410. Additionally, the transmit controller 430 may include one or more phase shifters used in conjunction with the transceivers 410 to implement a phased array. The phase shifters may implement fixed phase shifts (e.g., with passive phase shifters) or phase shifts controlled by the control subsystem of the transmit controller 430 (e.g., for beam steering). To implement beam steering in a 1D or a 2D phased array, the transmit controller 430 may include one or more digital to analog converters and a digital signal processing system in the control subsystem to generate signals of the appropriate phase shift. The transmit controller 430 may also include one or more voltage controlled oscillators (VCOs) controlled by the control subsystem of the transmit controller 430. The transmit controller 430 outputs a set of N electrical signals, $\{x_1(t), \ldots, x_N(t)\}$ that drive N of the transceivers 410 to generate ultrasound or electromagnetic radiation.

The receiver processor 420 receives electrical signals from the transceivers 410. In various embodiments, the receiver processor 420 receives R electrical signals, $\{y_1(t), \ldots, y_R(t)\}$, generated by the transceivers 410 in response to received signals (e.g., ultrasound or electromagnetic signals). Signals received by the transceivers 410 are a combination of reflections from the transmitted signals and random noise. The receiver processor 420 processes the received electrical signals, $\{y_1(t), \ldots, y_R(t)\}$. For example, the receiver processor 420 processes the received electrical signals using high pass filters, low pass filters, band pass filters, phase shifters, other analog signal processing component, or some combination thereof. The receiver processor 420 may detect characteristics of the processed signal or convert the processed electrical signals to digital signals using analog-to-digital converters, digital or analog down converters, power detectors, amplitude detectors, phase detectors, frequency detectors, correlators, or some combination thereof.

Based on the detected characteristics or digital signals, the receiver processor 420 creates a set of K scans, $\{S_1, \ldots, S_K\}$. Each scan, $S_i$ for $i \in \{1, \ldots, K\}$, may be based on multiple received signals (e.g., the full set $\{y_1(t), \ldots, y_R(t)\}$) or based on a portion of each of the received signals, $\{y_1(t), \ldots, y_R(t)\}$, corresponding to a range of time. In embodiments in which the transceivers 410 transmit pulses of ultrasonic sound or of electromagnetic radiation, a time period in which multiple pulses are transmitted may be used to generate a single scan. In some embodiments, different scans correspond to cross-sections of different portions of the eye. Cross-sectional planes for every scan may all be parallel, and planes may be separated by a fixed distance (e.g., 2.4/K cm, where K is the number of scans). In some embodiments, the receiver processor 420 produces 1-dimensional (1D) scans.

The set $\{S_1, \ldots, S_K\}$ of scans may be used to produce a single estimate of the orientation of the eye (e.g., to produce a single pair of $\alpha$ and $\beta$). As described above, the set $\{S_1, \ldots, S_K\}$ of scans may be generated based on the values of $\{y_1(t), \ldots, y_R(t)\}$ for a certain range of time (e.g., $T_1 < t < T_2$), which is also referred to herein as a "frame." In some embodiments, all frames have a fixed duration and occur with a constant frequency. In some embodiments, frames do not overlap in time, so a set of scans from a frame does not include an additional set of scans from another frame. Hence, sets of scans from different frames are generated from different, non-overlapping time periods. In other embodiments, frames overlap in time, where the scans of a frame are based on signals or scans from one or more previous frames, but not from frames corresponding to later times. For purposes of illustration, scanning the eye and estimating an eye's orientation is discussed herein with reference to a single set of scans, $\{S_1, \ldots, S_K\}$ for a single frame. However, the description herein regarding the estimation of an eye's orientation from a single frame may be applied to estimating the eye's orientation over time based on additional frames.

In some embodiments the receiver processor 420 outputs a single 3D scan, which may be based on a set of 2D scans (e.g., cross-sections). The single 3D scan may be a 2D surface embedded in a 3D space (e.g., the surface of the eye or the surface of the retina) or a 3D volume of a portion of the eye. The 3D volume of the portion of the eye may indicate the index of refraction, the rate of acoustic attenuation (e.g., in dB/cm), the rate of scattering, the rate of change of the index of refraction (e.g., a magnitude of the gradient of a function of the index of refraction), or some combination thereof. Thus, the 3D volume may be a function mapping three spatial dimensions to an estimate of an index of refraction at various points or to an estimate of another suitable quantity.

In some embodiments, the receiver processor 420 detects movement of the eye according to the Doppler Effect. The transceivers 410 implement Doppler scanning and the scans, $\{S_1, \ldots, S_K\}$, include velocity information corresponding to movement of the eye. Based on transmitted and received ultrasound signals via pulsed wave Doppler or continuous Doppler, pulsed radar, or continuous Doppler radar, the receiver processor 420 generates the scan. Ultrasound reflected from a point on the eye is imparted with a frequency shift based on the velocity of the point on the eye. Thus, Doppler ultrasound may detect the movement of the eye relative to the transceivers 410, from which the angular velocity of the eye can be determined. In some embodiments, the scans are generated via a Doppler radar system, such as coherent pulsed radar, pulse-Doppler radar, continuous wave radar, or frequency modulation radar. In some embodiments, scans include both velocity information and absolute position information.

The eye orientation estimation module 440 receives the set of scans, $\{S_1, \ldots, S_K\}$, of scans from the receiver processor 420 and generates an estimate of the orientation of the eye based on the set, $\{S_1, \ldots, S_K\}$, of scans and a model, M, from the model store 460. In various embodiments, the eye orientation estimation module 440 may compare the set, $\{S_1, \ldots, S_K\}$, of scans to the model of the eye, M, retrieved from the model store 460. As noted above, the model, M, may be a 3D model of the eye's surface or a 3D model of the structure of the eye. Altering the yaw, $\alpha$, and the pitch, $\beta$, of the model, M, may correspond to rotation of the 3D structure or surface included in the model, M. Comparing the set $\{S_1, \ldots, S_K\}$ of scans to the model, M, may comprise finding values of $\alpha$ and $\beta$ for which the model, M, most closely matches at least a subset of the set $\{S_1, \ldots, S_K\}$ of scans. For example, a least square error evaluation is used to determine values of $\alpha$ and $\beta$. In various embodiments, the eye orientation estimation module 440 comprises instructions that, when executed by one or more processors, a dedicated hardware unit, or some combination thereof cause the one or more processors or dedicated hardware unit to perform the functions further described herein.

In some embodiments, the eye orientation estimation module 440 determines the orientation of the eye by comparing the set $\{S_1, \ldots, S_K\}$ of scans to the model, M, using a number of test orientations, each test orientation comprising a pair of values for yaw, $\alpha$, and pitch, $\beta$. For each test orientation, the eye orientation estimation module 440 adjusts the model, M, and compares the scans to the model, M. In various embodiments, values in the set of test orientations are restricted to a certain bounded region. For example, the bounded region is defined by the eye's range of movement. In some embodiments, the region is restricted to values within a certain angular distance from the previously calculated yaw and pitch. The bounded region may be determined based on an upper bound value for the maximum speed of the eye. For example, the maximum angular saccade speed of the human eye is about 900° per second, so the bounded region may be constrained to within 1000° /F of the previously detected orientation of the eye, where F is a frequency with which the eye orientation estimation module 440 estimates the eye's orientation, measured in Hertz. The bounded region may also be narrowed based on the angular velocity of the eye detected via a Doppler system.

In some embodiments, the eye orientation estimation module 440 uses velocity information about the eye from Doppler ultrasound or radar in conjunction with information about the eye's absolute position to estimate the eye's orientation. For example, scans of the eye including detected velocity information are collected more frequently than scans including an absolute position of the eye. In various embodiments, the transmit controller 430 controls signals output by the one or more transceivers 410 to collect velocity scans (i.e., scans based on Doppler mode ultrasound or radar). The eye orientation estimation module 440 determines orientation of the eye may from the angular velocity of the eye and a prior orientation of the eye. Integrating the angular velocity of the eye allows the eye orientation estimation module 440 to determine the position of the eye based on a known prior position. To mitigate accumulation of drift error, the absolute orientation of the eye may be periodically detected. Estimating the orientation of the eye based on velocity information reduces the latency of eye tracking in the interim between obtaining new absolute orientation information. In some embodiments, detected velocity information is used to reduce error in the estimate of the eye's orientation by comparing the detected velocity to a difference between a current estimate of the eye's orientation and a prior estimate of the eye's orientation. In some embodiments, the eye orientation estimation module 440 outputs the yaw and pitch, $\alpha$ and $\beta$, respectively, of the eye as well as a yaw component and a pitch component of the angular velocity, $\omega_\alpha$ and $\omega_\beta$, respectively, of the eye.

In some embodiments, the transmit controller 430 and receiver processor 420 periodically switch between producing full scans (i.e., 3D or 2D scans) and producing 1D scans (i.e., A-mode ultrasound images). Many 1D scans may be generated in between each sequential pair of full scans. Multiple 1D scans originating from multiple transceivers may be generated simultaneously. The 1D scans may be used to supplement the full scans, by providing information to the eye orientation estimation module 440 in the interim between full scans. Since the 1D scans may require less energy and processing resources than full scans, the eye tracking unit 160 may operate more efficiently by utilizing this hybrid of full scans and 1D scans.

In some embodiments, a specific feature of the eye is tracked by the eye orientation estimation module 440. For example, the eye orientation estimation module 440 tracks a surface feature of the eye, such as: the cornea, the sclera, an interface of the cornea and the sclera, a vertex of the cornea, a blood vessel or some other deviation on the sclera, any other suitable external feature, and some combination thereof. In other examples the eye orientation estimation module 440 tracks one or more internal features of the eye, such as: the retina, the lens, the fovea, the optical disk, one or more blood vessels, any other suitable internal features, and some combination thereof. A location of the tracked feature may be determined from the scans of the eye, which may be used to estimate the orientation of the eye. To track a feature, an expected position of the tracked feature may be determined based on a position of the tracked feature in a frame corresponding to a time earlier than a current time or a detected velocity of the tracked feature. An area or a volume of the eye including the expected position may be selectively scanned to track the feature. However, the eye orientation estimation module 440 may use any suitable method to determine the values of yaw and pitch, respectively, α and β for which the model, M, and the set, {$S_1, \ldots, S_K$}, of scans most closely match.

In various embodiments, the eye tracking unit 160 is included in a VR system environment 100, such as further described above in conjunction with FIG. 1. For example, the eye tracking unit 160 is included in a virtual reality headset 105. However, components of the eye tracking unit 160 other than the one or more transceivers 410 may be separate from the virtual reality headset 105 in some embodiments. For example, components of the eye tracking unit 160 other than the one or more transceivers 410 are included in the virtual reality console 110. In some embodiments, processing data output by the eye tracking unit 160 is performed by one or more generic processors on the virtual reality console 110. Alternatively, specialized hardware included in the virtual reality console 110 processes data output by the eye tracking unit 160. In some embodiments, some components of the eye tracking unit 160 are included in the VR headset 105, while other components are included in the virtual reality console 110. In some embodiments, analog signal processing, analog-to-digital conversion, or digital-to-analog conversion implemented by the eye tracking unit 160 is performed by components of the eye tracking unit 160 in the virtual reality headset 105, while digital signal processing and estimation of the eye's orientation is performed by components of the eye tracking unit 160 in the virtual reality console 110.

Figure 5:
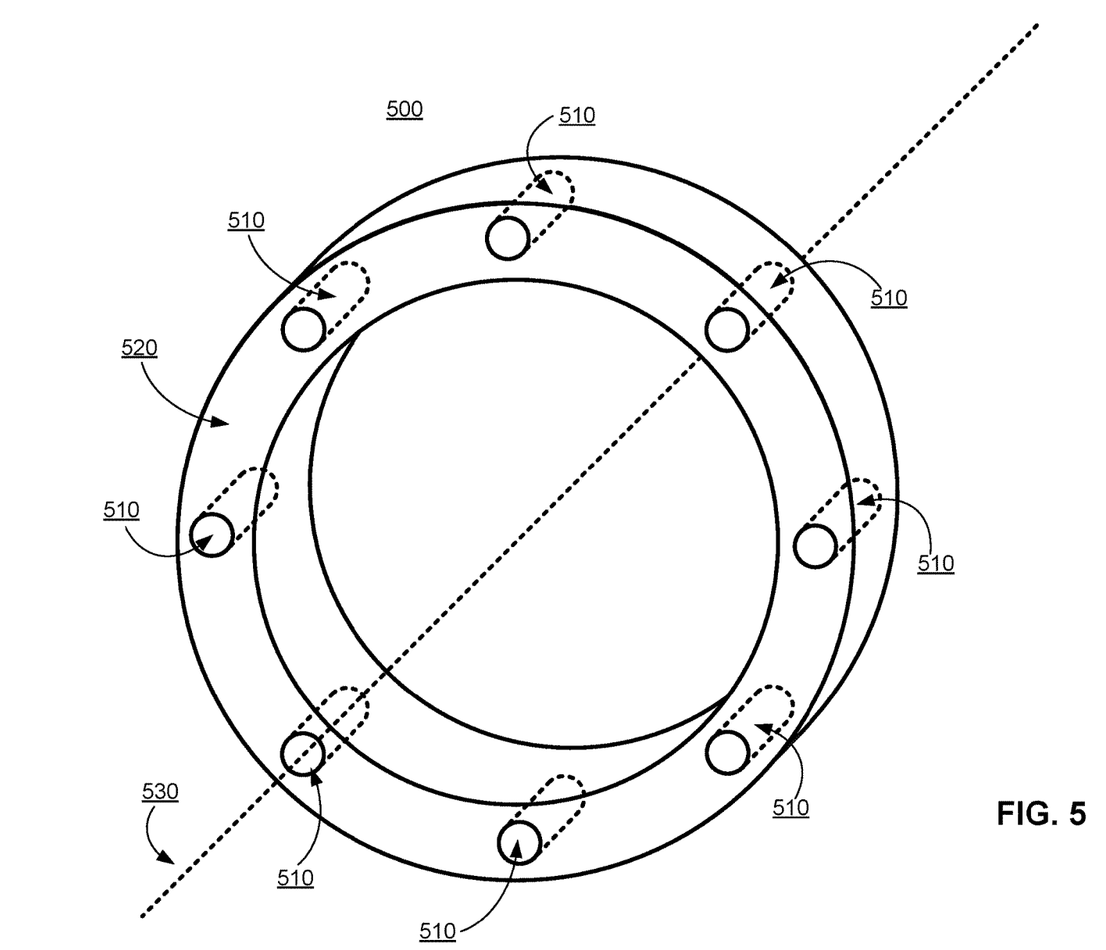
FIG. 5 is a diagram of a ring of transceivers in accordance with an embodiment.

FIG. 5 is a diagram of one embodiment of a ring of transceivers 500 for the eye tracking unit 160. In the example of FIG. 5, the ring of transceivers 500 includes eight transceivers 510 and a ring 520. In some embodiments, the transceivers 510 are ultrasound transducers and the ring 520 comprises a material having a high attenuation rate for ultrasound, allowing the ring 520 to act as an insulator between the transceivers 510. In some embodiments, the transceivers are radar antennas. FIG. 5 also illustrates an axis 530 of the ring 520, which is a line orthogonal to the ring 520 passing through a center of the ring 520. In some embodiments, the ring of transceivers 500 is mounted in the VR headset 105 so the axis 530 of the ring 520 is positioned along a center axis of the eye (e.g., the axis 335 of the eye 330). The ring of transceivers 500 may be placed so the center of the ring 540 is within a threshold distance of the eye (e.g., less than 40 cm from the cornea). In some embodiments, the transceivers 510 are circularly arranged but are mounted in or to a rigid object that is not a ring.

In the example shown by FIG. 5, each transceiver 510 is oriented parallel to the axis 530 of the ring 520. However, in other embodiments, one or more transceivers 510 are oriented toward the axis 530 of the ring 520. An axis of a transceiver 510 may intersect the axis 530 of the ring 520 at a single point (e.g., at the point of rotation for the user's eye) in various embodiments. Although FIG. 5 depicts eight transceivers 510, any number of transceivers 510 may be included in the ring 520. Similarly, in some embodiments, transceivers 510 may be replaced with receivers or transmitters.

Alternate configurations and arrangements of transceivers may also be used. For example, transparent antennas (e.g., indium tin oxide (ITO) antennas) used as radar transceivers may be located between the user's eye and the electronic display 115. These transparent antennas may be patch antennas or a planar antennas disposed upon the electronic display 115, disposed on the optics block 118 (e.g., on a lens on the optics block 118), or embedded within the optics block 118. These transparent antennas may be arranged in any configuration suitable for a 2D or 3D phased array.

Figure 6:
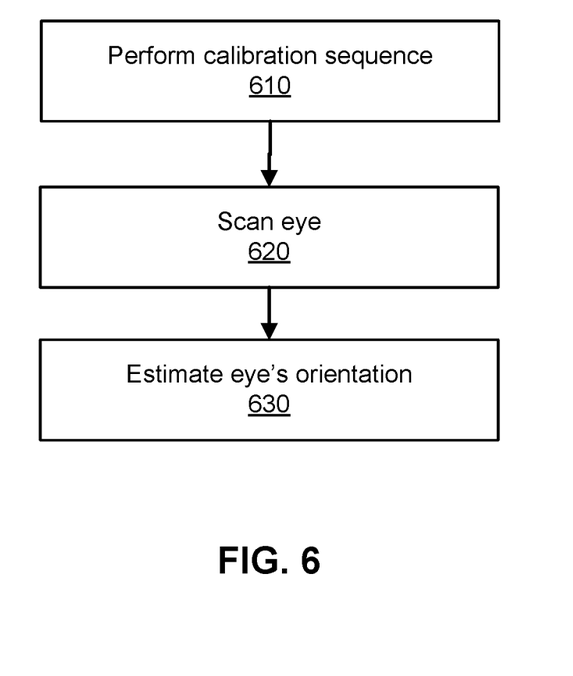
FIG. 6 is a block diagram illustrating a process for tracking eye movement, in accordance with some embodiments.

FIG. 6 is a flowchart of one embodiment of a process for tracking eye movement. In various embodiments, the process shown by FIG. 6 may be performed by the eye tracking unit 160. Other components may perform some or all of the steps of the process in other embodiments. In some embodiments, the process includes different or additional steps than those described in conjunction with FIG. 6 or performs the steps in different orders than the order described in conjunction with FIG. 6.

The eye tracking unit 160 performs 610 a calibration sequence, where transceivers 410 repeatedly scan an eye of the user. As further described above in conjunction with FIG. 4, the eye tracking unit 160 generates or trains a model of the eye, M, based on the scans of the eye. After generation or training, the model, M, is stored by the eye tracking unit 160.

After storing the model, M, the eye tracking unit 160 scans 620 the eye using the transceivers 410. In some embodiments, the transceivers 410 scan 620 the eye comprises by emitting ultrasonic signals and receiving echoes generated by interaction of the ultrasonic signals with the eye. The transceivers 410 convert the received echoes into electrical signals, {$y_1(t), \ldots, y_R(t)$}. Alternatively, the transceivers 410 scan 620 the eye by emitting electromagnetic radiation, receiving signals reflected by the eye, and subsequently converting the received signals into electrical signals, {$y_1(t), \ldots, y_R(t)$}. As further described above in conjunction with FIG. 4, the eye tracking unit 160 processes the generated electrical signals, {$y_1(t), \ldots, y_R(t)$}, to generate a set, {$S_1, \ldots, S_K$}, of scans.

Based on the set, {$S_1, \ldots, S_K$}, of scans, the eye tracking unit 160 estimates 630 an orientation of the eye. In various embodiments, the eye tracking unit 160 compares the set, of scans generated when scanning 620 the eye to the stored model, M, to estimate 630 the eye's orientation and generates an estimate of the orientation of the eye based on the comparison. For example, the estimate of the orientation of the eye comprises a pair of values, α and β, which correspond to the yaw and pitch, respectively, of the eye. In some embodiments the orientation of the eye may further comprise a yaw and pitch component of the angular velocity, $\omega_\alpha$ and $\omega_\beta$, respectively, of the eye.

In some embodiments, after estimating 630 the eye's orientation, the eye tracking unit 160 again scans 620 the eye to determine an additional set {$S_1, \ldots, S_K$} of scans for a different frame corresponding to a subsequent time. Thus, the eye tracking unit 160 may repeatedly scan 620 the eye and estimate 630 its orientation to track the orientation of the eye over time, allowing continuous monitoring of the eye's orientation. In some embodiments, the eye tracking unit 160 begins estimating 630 the eye's orientation prior to completing scanning 620 of the eye. For example, the eye tracking unit 160 begins estimating the eye's orientation using a subset of the set, {$S_1, \ldots, S_K$}, of scans (e.g., the first scan, $S_1$) before the complete set, {$S_1, \ldots, S_K$}, of scans has been generated. In some embodiments, scanning 620 of the eye for a frame begins before the eye tracking unit 160 completes processing a prior frame. Alternatively, scanning 620 the eye and estimating 630 its orientation is not done continuously. The eye's orientation may be detected responsive to a call from higher software layer (e.g., a system call from a software application stored in the application store 145).

In some embodiments, the eye tracking unit 160 generates an error code or signal if the eye tracking unit 160 is unable to estimate the eye's orientation with at least a threshold level of accuracy. For example, the eye tracking unit 160 generates the error code or signal because the user blinks. The eye tracking unit 160 may determine whether to generate an error code by determining a degree to which the model, M, matches the set, $\{S_1, \ldots, S_K\}$, of scans and determining whether the degree is within a threshold. If the degree to which the model M, matches the set, $\{S_1, \ldots, S_K\}$, of scans exceeds the threshold, the eye tracking unit 160 generates the error code. In some embodiments, the eye tracking unit 160 stops scanning 620 the eye and again performs 610 the calibration sequence if the eye tracking unit 160 generates at least a threshold number of error codes within a specified time interval.

Additional Configuration Information

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. An eye tracking unit comprising:
   a plurality of ultrasonic transmitters configured to transmit ultrasonic sound towards an eye of a user, the plurality of ultrasonic transmitters arranged along a ring having a center axis passing through a center of the ring and through the eye;
   a plurality of ultrasonic receivers configured to receive an echo generated by interaction of the ultrasonic sound with the eye, the plurality of ultrasonic receivers arranged along the ring; and
   an eye orientation estimation module configured to:
      determine one or more cross-sectional scans for the eye based on the received echo;
      detect a position and thickness of one or more internal features of the eye based on the one or more cross-sectional scans, wherein the one or more internal features includes at least a sclera of the eye; and
      estimate an orientation of the eye based in part on detecting the position and the thickness of the one or more internal features and a model of the eye.

2. The eye tracking unit of claim 1, wherein the eye tracking unit is a component of a head-mounted display (HMD), the HMD comprising:
   a display element configured to display content to the user, the user wearing the HMD; and
   an optics block configured to direct light from the display element to an exit pupil of the HMD.

3. The eye tracking unit of claim 1, wherein each of the plurality of ultrasonic transmitters is an ultrasonic transceiver that operates as an ultrasonic receiver to receive the echo.

4. The eye tracking unit of claim 1, further comprising a calibration module, the calibration module configured to:
   control a display element to display a visual indicator at a position on the display element;
   receive, from the plurality of ultrasonic receivers, a calibration echo corresponding to a calibration ultrasonic sound transmitted by the plurality of ultrasonic transmitters; and
   train the model of the eye of the user based on the received calibration echo and based on the position of the visual indicator.

5. The eye tracking unit of claim 1, wherein the eye orientation estimation module is configured to:
   estimate a direction of a pupillary axis of the eye; and
   estimate a direction of a foveal axis of the eye based on the estimated direction of the pupillary axis and based on an offset between the pupillary axis and the foveal axis.

6. The eye tracking unit of claim 1, wherein the eye orientation estimation module is further configured to estimate the orientation of the eye based in part on detecting a position of a feature of the eye based on the echo and the model of the eye, the feature selected from a group consisting of a curvature of the cornea, a cornea-sclera interface, iris features beneath the cornea, and a vertex of the cornea.

7. The eye tracking unit of claim 1, wherein the eye orientation estimation module is further configured to estimate the orientation of the eye based in part on determining a yaw, pitch, and roll rotation for the eye and a 3-dimensional translation vector for the eye.

8. The eye tracking unit of claim 1, wherein the plurality of ultrasonic transmitters includes multiple transmitters that operate as a phased array.

9. The eye tracking unit of claim 1, wherein the ring comprises a material that insulates the plurality of ultrasonic transmitters and the plurality of ultrasonic receivers from ultrasonic sound from neighboring ultrasonic transmitters.

10. The eye tracking unit of claim 1, wherein each of the plurality of the ultrasonic transmitters and each of the plurality of ultrasonic receivers is directed at a point along the center axis.

11. The eye tracking unit of claim 1, wherein the eye orientation estimation module is further configured to:
   determine, at a first time, absolute position information for the eye based on a multi-dimensional scan of the eye generated from a first echo received by the plurality of ultrasonic receivers;
   determine, at a second time later than the first time, angular velocity information for the eye based on Doppler frequency shifts in a second echo received by the plurality of ultrasonic receivers; and
   estimate the orientation of the eye by updating the absolute position information from the first time based on the angular velocity information determined at the second time.

12. The eye tracking unit of claim 1, wherein the one or more internal features of the eye further includes a retina, a lens, a fovea, a cornea, an optical disk, and one or more blood vessels of the eye.

13. An eye tracking unit comprising:
   a first set of ultrasonic transmitters configured to transmit a first ultrasonic sound towards a first eye of a user, the first set of ultrasonic transmitters arranged along a first ring having a center axis passing through a center of the first ring and through the first eye;
   a second set of ultrasonic transmitters configured to transmit a second ultrasonic sound towards a second eye of the user, the second set of ultrasonic transmitters arranged along a second ring having a center axis passing through a center of the second ring and through the second eye;
   a first set of ultrasonic receivers configured to receive a first echo generated by interaction of the first ultrasonic sound with the first eye, the first set of ultrasonic receivers arranged along the first ring;
   a second set of ultrasonic receivers configured to receive a second echo generated by interaction of the second ultrasonic sound with the second eye, the second set of ultrasonic receivers arranged along the second ring; and
   an eye orientation estimation module configured to:
      determine one or more cross-sectional scans for the first eye based on the first echo,
      determine one or more cross-sectional scans for the second eye based on the second echo;
      detect a position and thickness of one or more internal features of the first eye based on the one or more cross-sectional scans for the first eye, wherein the one or more internal features includes at least a sclera of the first eye;
      detect a position and thickness of one or more internal features of the second eye based on the one or more cross-sectional scans for the second eye, wherein the one or more internal features includes at least a sclera of the second eye;
      estimate a first orientation of the first eye based on detecting the position and the thickness of the one or more internal features of the first eye and based on a first model of the first eye, and
      estimate a second orientation of the second eye based on detecting the position and the thickness of the one or more internal features of the second eye and based on a second model of the second eye.

14. The eye tracking unit of claim 13, wherein the eye tracking unit is a component of a head-mounted display (HMD), the HMD configured to determine an inter-pupillary distance of the user using the first orientation and the second orientation.

15. The eye tracking unit of claim 13, wherein the eye tracking unit is a component of a head-mounted display (HMD), the HMD configured to determine a gaze direction of the user using the first orientation and the second orientation.

16. The eye tracking unit of claim 13, further comprising a calibration module, the calibration module configured to:
   control a display element to display a visual indicator at a position on the electronic element;
   receive, from the first set of ultrasonic transmitters, a calibration echo corresponding to a calibration ultrasonic sound transmitted by the first set of ultrasonic transmitters; and
   train the first model based on the received calibration echo and based on the position of the visual indicator.

17. The eye tracking unit of claim 13, wherein the eye orientation estimation module is further configured to:
   estimate a direction of a pupillary axis of the first eye; and
   estimate a direction of a foveal axis of the first eye based on the estimated direction of the pupillary axis and based on an offset between the pupillary axis and the foveal axis.

18. The eye tracking unit of claim 13, wherein the eye orientation estimation module is further configured to estimate the orientation of the first eye based in part on detecting a position of a feature of the first eye based on the first echo and the first model, the feature selected from a group consisting of the curvature of a cornea, a cornea-sclera interface, iris features beneath the cornea, and a vertex of the cornea.

19. The eye tracking unit of claim 13, wherein the eye orientation estimation module is further configured to estimate the first orientation and the second orientation based in part on determining, for each of the first eye and the second eye, a respective yaw, pitch, and roll rotation and a respective translation vector for the eye.

20. The eye tracking unit of claim 13, wherein each of the first set of ultrasonic transmitters is an ultrasonic transceiver that operates as one of the first set of ultrasonic receivers to receive the first echo, and wherein each of the second set of ultrasonic transmitters is an ultrasonic transceiver that operates as one of the second set of ultrasonic receivers to receive the second echo.

* * * * *